(12) United States Patent
Li et al.

(10) Patent No.: US 6,918,022 B2
(45) Date of Patent: Jul. 12, 2005

(54) MEMORY SPACE ORGANIZATION

(75) Inventors: Fulton Q. Li, Beaverton, OR (US); Douglas J. Brucks, Aloha, OR (US); Dhiraj U. Bhatt, Portland, OR (US)

(73) Assignee: Intel Corporation, Santa Clara, CA (US)

(*) Notice: Subject to any disclaimer, the term of this patent is extended or adjusted under 35 U.S.C. 154(b) by 494 days.

(21) Appl. No.: 09/795,546

(22) Filed: Feb. 28, 2001

(65) Prior Publication Data
US 2002/0120822 A1 Aug. 29, 2002

(51) Int. Cl.$^7$ .............................................. G06F 13/00
(52) U.S. Cl. ..................... 711/171; 711/114; 711/170; 711/203
(58) Field of Search ................. 711/114, 170, 711/171, 203

(56) References Cited

U.S. PATENT DOCUMENTS

| | | | | |
|---|---|---|---|---|
| 5,339,411 A | * | 8/1994 | Heaton, Jr. | 711/171 |
| 5,673,381 A | * | 9/1997 | Huai et al. | 714/1 |
| 5,987,506 A | * | 11/1999 | Carter et al. | 709/213 |
| 6,023,712 A | * | 2/2000 | Spear et al. | 707/205 |
| 6,185,655 B1 | * | 2/2001 | Peping | 711/6 |
| 6,449,688 B1 | * | 9/2002 | Peters et al. | 711/112 |

\* cited by examiner

Primary Examiner—Reba I. Elmore
(74) Attorney, Agent, or Firm—Trop, Pruner & Hu, P.C.

(57) ABSTRACT

A method provided comprises querying a plurality of devices for storage space. The method also comprises allocating, as at least a single storage unit, a portion of the plurality of the devices for storage across the plurality of devices. The method further comprises enabling storing of the data into the portion of the plurality of devices.

29 Claims, 8 Drawing Sheets

| Symbolic identifier of the memory section (sID) | Displacement (d) | Length (l) |

FIGURE 5

MEMORY SPACE ORGANIZATION

BACKGROUND

This invention relates generally to processor-based systems, and, more particularly, to memory space organization across multiple devices.

The ability to organize and access memory is generally a useful feature for processor-based systems. Efficient access to memory is generally useful for devices that host or execute applications. Shared memory is an attractive design model for building distributed applications. Examples of distributed applications include linking multiple computer systems, linking multiple appliances with a processor-based system, and the like.

Conventional systems manage memory on a separate device basis. In other words, separate memory blocks are organized in each separate device that is linked onto a process-based system. The memory on these separate-device systems is generally addressable using offsetting processes, physical addressing, or virtual addressing. In some cases, such as in memory allocation in accelerated graphics port (AGP) applications, it is possible for an application to allocate space from one of a number of devices. Conventional systems also allow for allocating memory on a distributed computing environment, where a computer is configured as a distributed computer. However, an efficient means of allocating memory spaces across a number of devices that are not configured as a distributed device, or across distributed devices that have diverse controlling system is lacking. Furthermore, the industry lacks an efficient means for distributed devices to share memory resources across a plurality of devices.

Thus, there is a need for a better way to share memory resources across a number of devices.

BRIEF DESCRIPTION OF THE DRAWINGS

The invention may be understood by reference to the following description taken in conjunction with the accompanying drawings, in which like reference numerals identify like elements, and in which:

FIG. 5 is a stylized block diagram illustration of a virtual address in accordance with one embodiment of the present invention;

DETAILED DESCRIPTION

Figure 1:
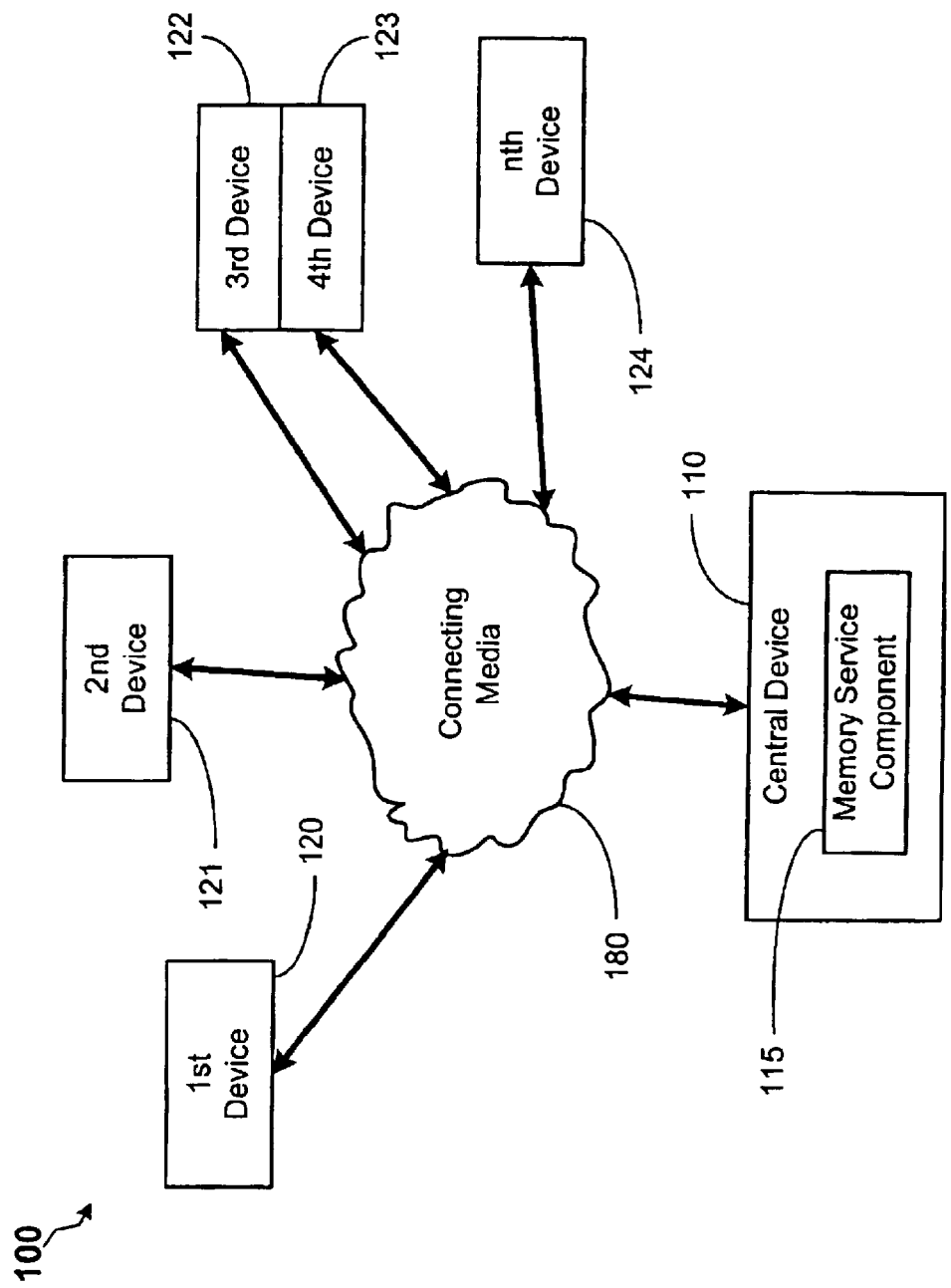
FIG. 1 is a front elevational view of a processor-based system, in accordance with one embodiment of the present invention.

FIG. 1 illustrates a processor-based system 100, which comprises a first device 120, a second device 121, a third device 122, and a fourth through nth device 123, 124, being interconnected via a connecting media 180 to a central device 110. In one embodiment, the first through nth devices 120–124 are processor-based devices. In one embodiment, the first through nth devices 120–124 are separate devices that exist on separate communication buses. In an alternative embodiment, a single device can be partitioned into two or more devices, as illustrated by the third device 122 and the fourth device 123. In one embodiment, the central device 110 is able to access addressable space from a pool of memory space that exists on the first through nth devices 120–124. In one embodiment, the connecting media 180 is a network connection.

The network connection typically may be either a private network connection or a public network connection, or a combination of both. Examples of the network connection include communication networks, channels, links, or paths, and systems or devices (such as routers) used to route data over such networks, channels, links, or paths. A private network connection may include a mainframe computer access and local area networks (LANs) or wide area networks (WANs), while one example of a public network connection is the Internet. The types of devices or systems that have access to the communication networks include both wired and wireless devices or systems. Examples of wired devices include personal desktop computer systems that have access to the network connection through dial-up services or other types of data network connection services. Wireless devices (e.g., portable computers with wireless modems, personal digital assistants, mobile telephones) have access to the network connection over wireless infrastructures.

In one embodiment, processor-based applications may be executed in a device independent of each of the first through nth devices 120–124 and the central device 110. The central device 110 comprises a memory service component 115 that is capable of organizing and addressing memory portions from the first through nth devices 120–124. Applications being executed on the first through nth devices 120–124 and on the central device 110, may refer to memory spaces organized by the memory service component 115 in a symbolical addressing fashion. The addressing symbols used by the applications to address pooled memory space may include numerical symbols, string symbols, or Globally Unique Identifiers (GUID). Applications to map multiple offsets and addresses such that symbolic addressing refers to address spaces instead of simply referring to address blocks.

The memory service component 115, which may be located in the central device 110, is capable of organizing memory locations from each of the first through nth devices 120–124, such that a single device can access a portion of memory that is larger than the memory that is available on that particular device. For example, the first device 120 may only contain 4-kilobytes of memory, however, the first device 120 may require the storage of a data file that is 4-megabytes. Therefore, utilizing the memory service component 115, an application being executed on the first device 120 may direct a write sequence that will store the data file into the second, third, and the fourth devices 121–123. In other words, the application running in the first device 120, when executing a memory access, will "see" a 4-megabyte contiguous memory; even though that 4-megabyte memory is actually pooled from multiple locations in other devices 121–124. The application running in the first device 120 can address the 4-megabyte memory space by employing a symbolic addressing protocol, described in further detail below.

Using the embodiments described in the present invention, a system can be used for distributed applications by using memory service components 115, which can operate on multiple devices 120–124 to share addressable spaces mapped across the devices 120–124. The memory service component 115 can also be used to provide windowing support, where an application using memory on one device 120 has a window to a larger memory space on another device 121. Furthermore, the memory service component 115 can provide data integrity support, where data stored in one device 121 is mirrored on a plurality of other devices 121–124.

Figure 2:
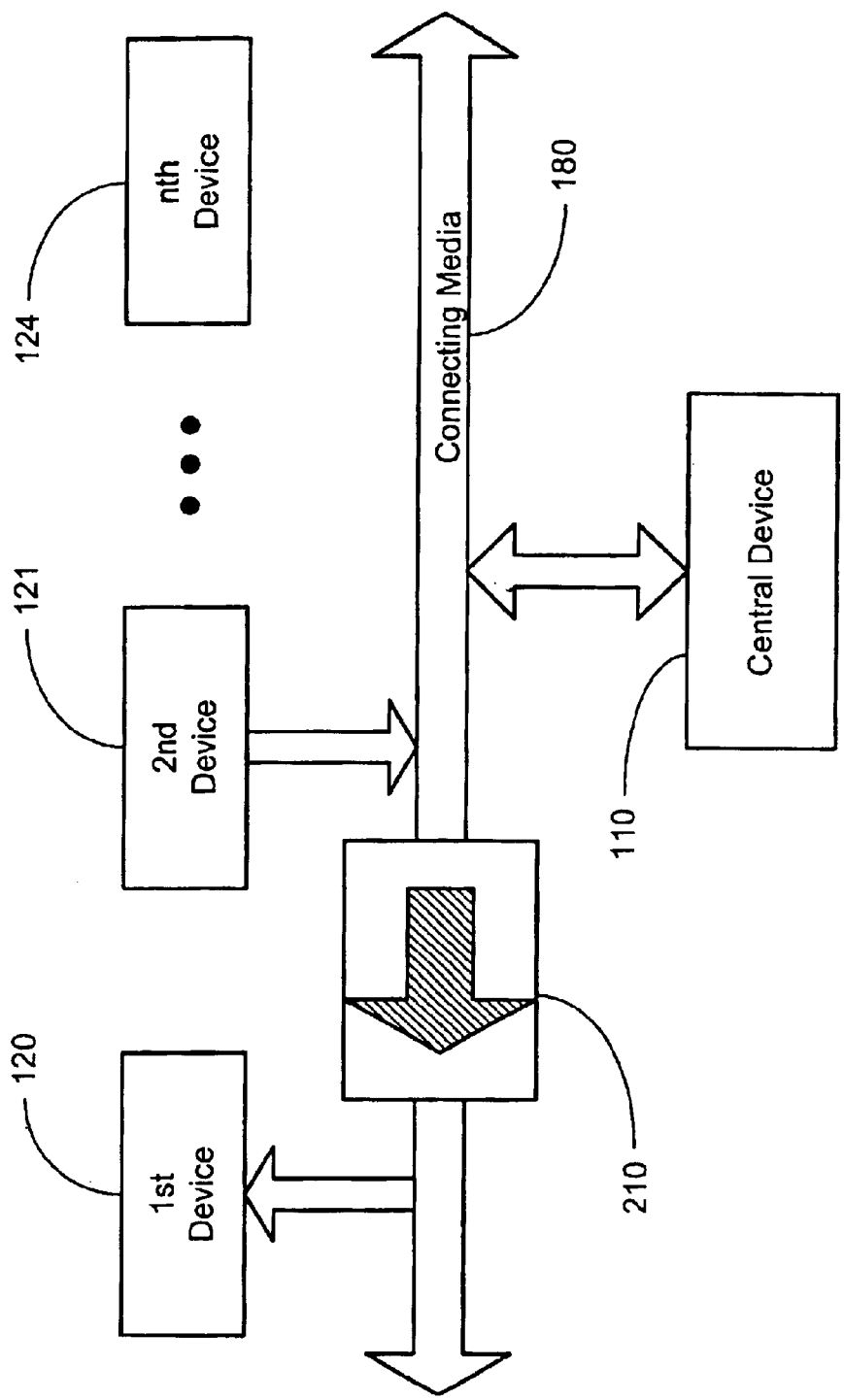
FIG. 2 is a stylized block diagram of the processor-based system performing an operation in accordance with one embodiment of the present invention.

Turning now to FIG. 2, the second device 121 initiates a write sequence which is intercepted by an address snooping agent 210 that redirects the write sequence onto the first device 120. In one embodiment, the snooping agent 210 is contained within the memory service component 115. The snooping agent 210 is capable of locating the address space provided by the memory service component 115, and redirecting a write sequence onto the proper target address. The second device 121 attempts a write sequence in one example. The memory service component 115 and the central device 110 provide a specific address for the write sequence, which addresses a memory location in the first device 120. The address snooping agent 210 then locates and directs the write sequence onto the proper memory location in the first device 120. The address snooping agent 210 is capable of redirecting a write sequence that accesses an address space that is spread across several devices. The address snooping agent 210 is controlled by the memory service component 115, and therefore, has access to addresses that point to memory space in the multiple devices 120–124.

Figure 3A:
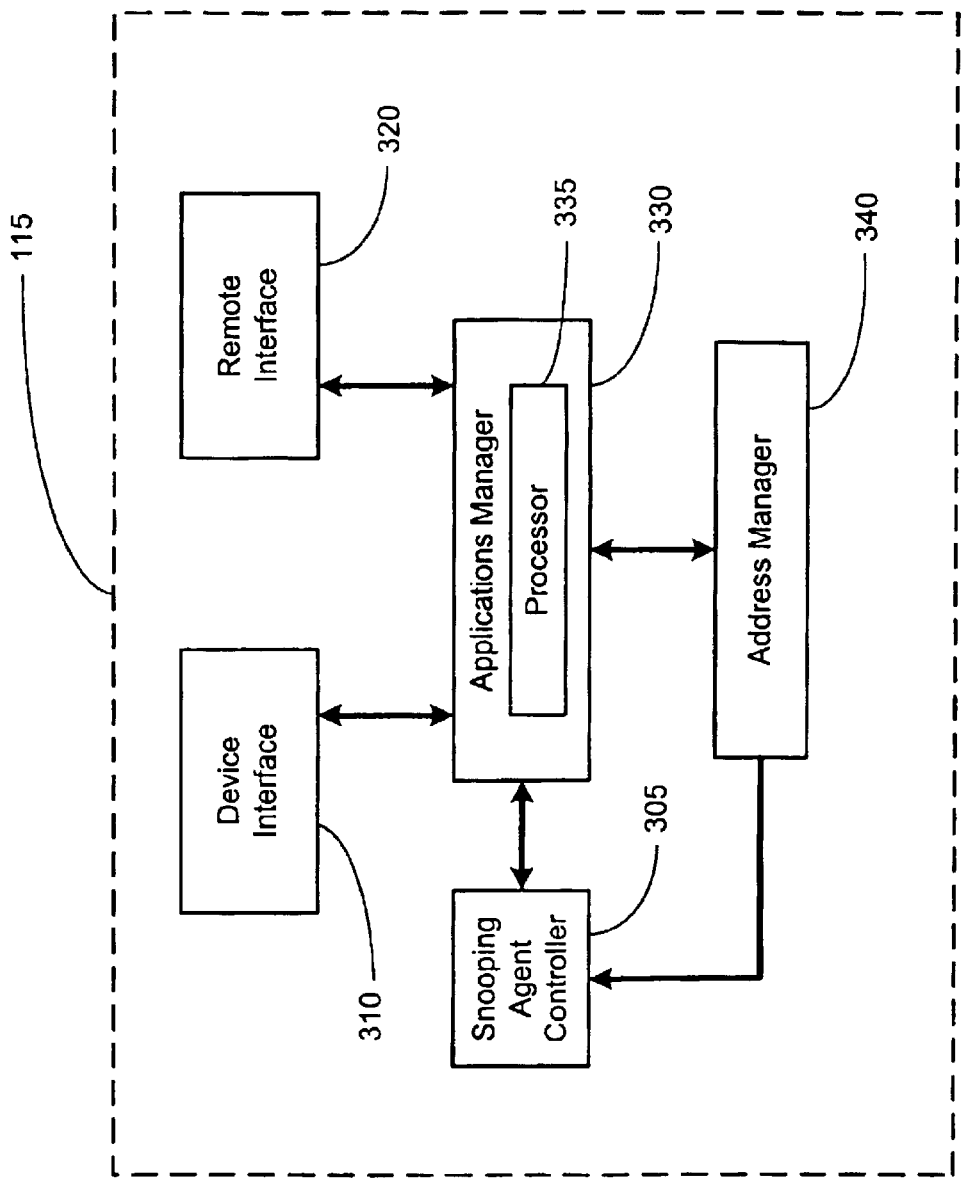
FIG. 3A is a stylized block diagram of a memory service component in accordance with one embodiment of the present invention.

FIG. 3A illustrates a device interface 310, a remote interface 320, an application interface 330, an address manager 340, and a snooping agent controller 350 that comprise the memory service component 115. One or more devices, including the central device 110 and the first through nth devices 120–124, may comprise a memory service component 115. The device interface 310 generally allows the memory service component 115 to interface with other devices that are local to a host device in which the memory service component 115 resides. For example, the central device 110, that contains the memory service component 115, may be a personal computer (PC). The device interface 310 may enable the PC to communicate with local devices such as a network card, or other devices where there is a direct bus connection from the PC to the local device in one embodiment.

The remote interface 320 enables the memory service component 115 to communicate with devices that are remote to the host device that hosts the memory service component 115. For example, the central device 110 that contains the memory service component 115, may communicate with a remote device, such as an external home appliance, or another PC, via the remote interface. In one embodiment, a remote interface 320 is capable of radio frequency (RF) communications that can enable the central device 110 to communicate with an external device in a wireless fashion.

Figure 3B:
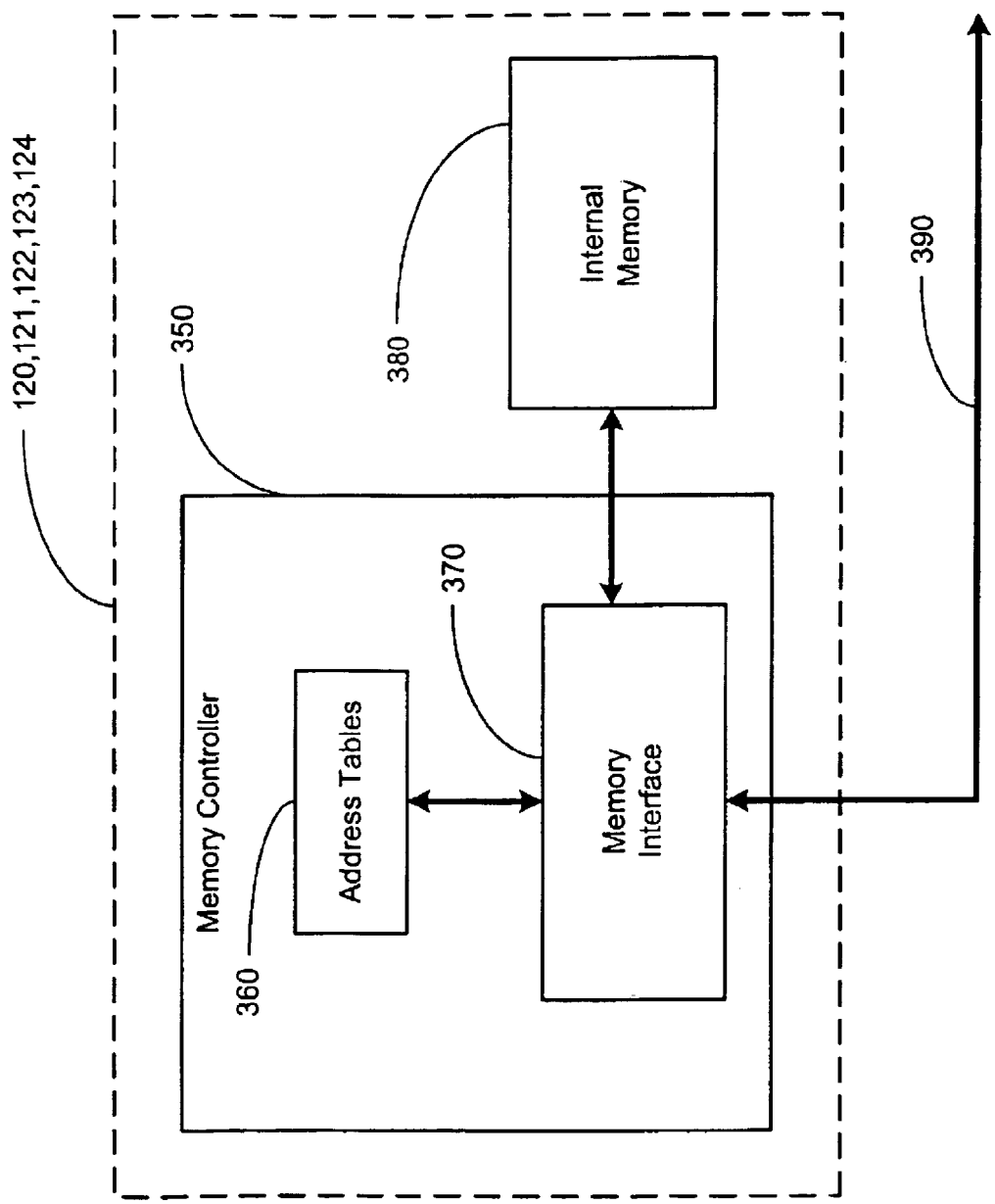
FIG. 3B is a stylized block diagram of a memory controller located within a device in the process-based system, in accordance with one embodiment of the present invention.

The application interface 330 allows the memory service component 115 to communicate with the devices 120–124 on an application layer (i.e., an application operating in one device communicating directly with an application operating in another device). In one embodiment, the applications manager 330 comprises a processor 335 that is capable of facilitating application layer communications between the memory service controller 115 and the devices 120–124. Using the application interface 330, the memory service component 115 can access an application that is running on the first device 120 such that the application running on the first device 120 can execute a memory access that addresses memory that are contained on devices 121–124, where the partitioning of the memory is transparent to the application. In other words, from the point of view of the application running on device 120, the application "sees" a memory section that is contiguous, but in reality that memory section may be contained within a plurality of devices 121–124. In one embodiment, this is accomplished by using a memory controller 230, shown in FIG. 3B.

In one embodiment, each device 120–124 comprises a memory controller 350 that includes an address table 360 and a memory interface 370. Memory access requests from other components (not shown) in a device 120 is handled by the memory controller 350. In one embodiment, if the memory access request is for memory space that is contained within the device 120, the memory interface 370 routes the memory access request to the internal memory 380. If the memory access request relates to accessing memory that is larger than the memory available within the device 120, the memory interface 370 routes the memory access request to the memory service component 115, via a line 390. The memory service component 115 will then direct the memory access request to the appropriate memory space, which may be contained across the plurality of devices 120–124.

Furthermore, the memory service component 115 can access the internal memory 380 of a device 120 via the memory interface 370. In one embodiment, the memory interface 360 can check the address tables 360 to address memory space requested by the memory service component 115. In one embodiment, the memory service component 115 can update the entries in the address tables 360. The memory interface 370 allows components in a device 120 to initiate memory space requests that may be carried out by the memory service component 115.

Turning back to FIG. 3A, the address manager 340 in the memory service component 115 is capable of allocating and organizing memory space that represents a single memory unit, across a plurality of devices 120–124. In other words, the address manager 340 can allocate memory such that a plurality of devices 120–124 can share addressable spaces mapped across the different devices 120–124. The address manager 340 employs a snooping agent controller 305 to invoke the address snooping agent 210 in order to locate memory space addressed by the address manager 340.

Figure 4:
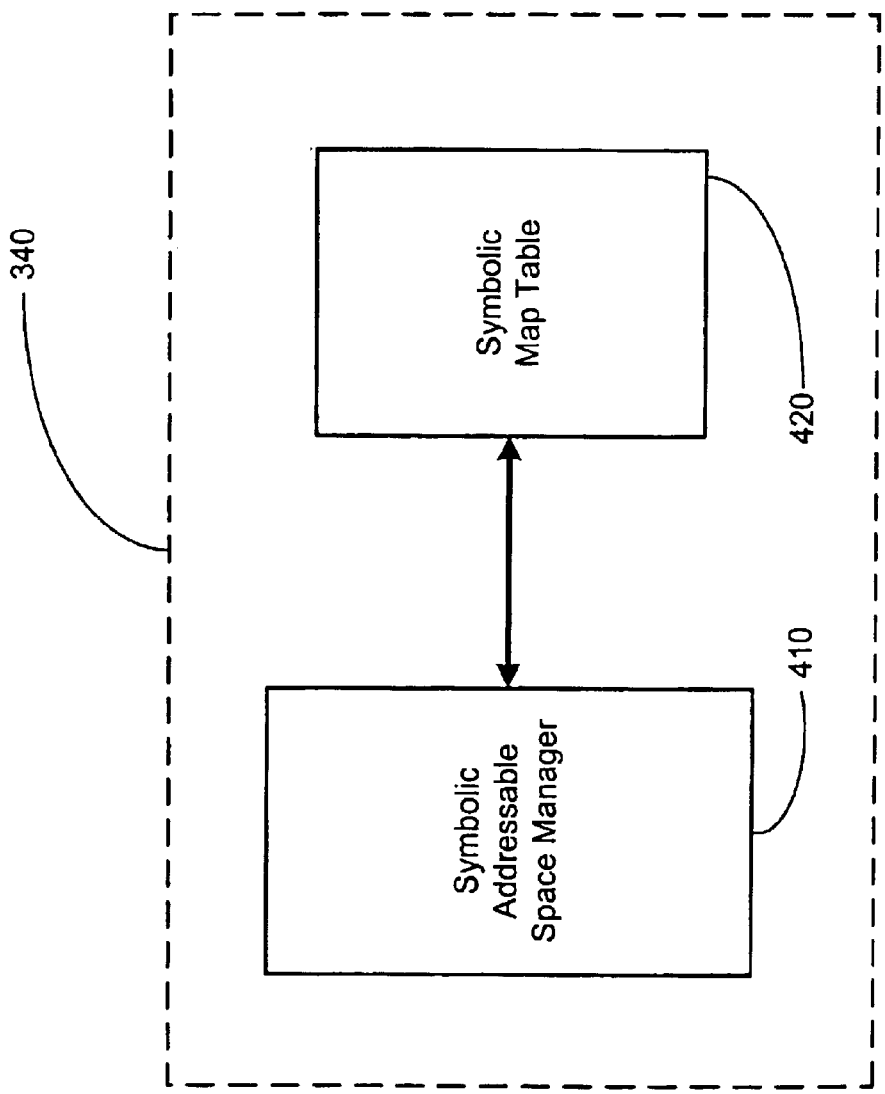
FIG. 4 is a stylized block diagram of an address manager in accordance with one embodiment of the present invention.

FIG. 4 illustrates a symbolic addressable space manager 410 and a symbolic map table 420 that comprise the address manager 340. The symbolic map table 420 comprises mapping tables that allow the symbolic addressable space manager 410 to map symbolic addresses that represent real memory addresses. The symbolic addressable space manager 410 generates a symbolic address that specifies a real memory location within a device 120, or across a plurality of devices 120–124. In one embodiment, the address manager 340 comprises an algorithm that is capable of matching a virtual logical address, (i.e., the symbolic address) to real memory space in the devices 120–124.

In one embodiment, addresses in a symbolic addressable space system are multi-dimensional. In order to refer to a particular real memory space, an algorithm in the address manager 340 specifies a symbol (or a symbolic identifier), which points to a memory location; a displacement of the memory location, which points to which part of the memory location is to be addressed, and the segment (the length) of the memory segment within the memory location. The symbol can be a numeric-symbol or a alpha-symbol, which point to a memory location. FIG. 5 illustrates a virtual address format for a symbolic addressable space. The virtual address comprises a symbolic identifier of the memory location (sID), a displacement value (d), and a length of the memory section (l). The address manager 340 can locate a real memory location within a device 120 or a plurality of devices 120–124 using the virtual address described above. The virtual address (v) is a function of the symbolic identifier and the displacement, as shown in Equation 1.

Virtual address$(v)=(sID, d)$.  Equation 1

Figure 6:
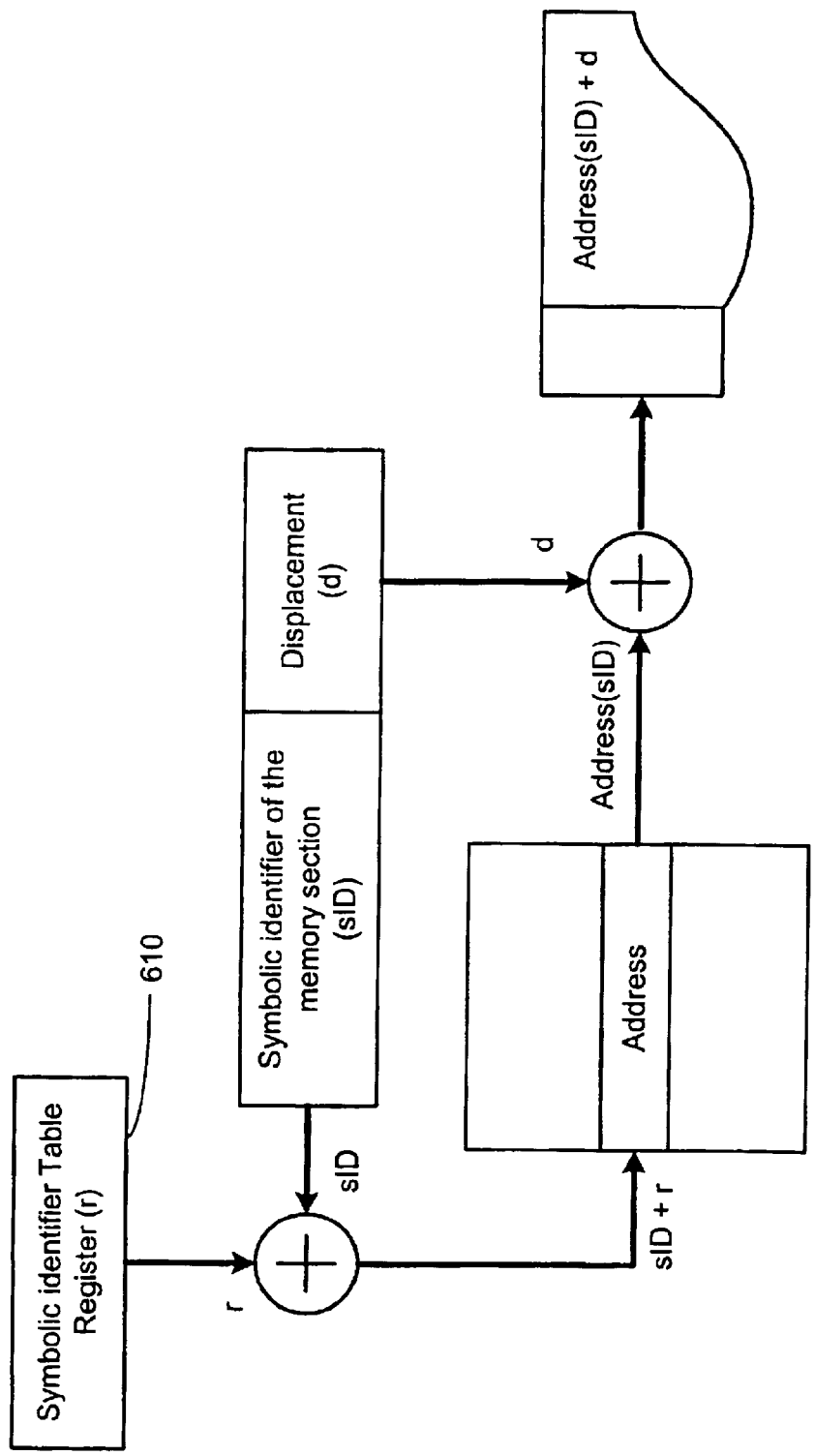
FIG. 6 illustrates an address calculation operation in accordance with one embodiment of the present invention.

FIG. 6 illustrates a block diagram of the operation of an algorithm in the address manager 340 that is used to locate a real memory location from a virtual address. In order to locate a real memory address, the symbolic identifier (sID) and the displacement (d) are used. The symbolic identifier table register 610 provides information that indicates which addressing table in the memory service component 115 is to be used for addressing memory. The memory service component 115 adds the symbolic identifier table register value (r) to the symbolic identifier (sID). The symbolic identifier table register value (r) represents the table that is used to locate the address. The memory service component 115 may comprise a plurality of tables, such as a fast-access memory table, a read-only memory table, a mirrored-memory table, and the like. The memory service component 115 then adds the displacement value (d), to the address space in order to locate the real address in a device 120 (see Equation 2).

Real Address=Address$(sID)+d$  Equation 2

In one embodiment, the calculation of the real address from the virtual address is performed by the snooping agent controller 350 such that the address snooping agent 210 can locate the memory location in a device 120, or across a plurality of devices 120–124. Using the memory controller 350 in each of the devices and the address tables in the memory service component 115, the memory service component 115 can assess which memory section in any given device 120–124 is associated with a particular section of memory that is addressable using the symbolic addressing described above.

Figure 7:
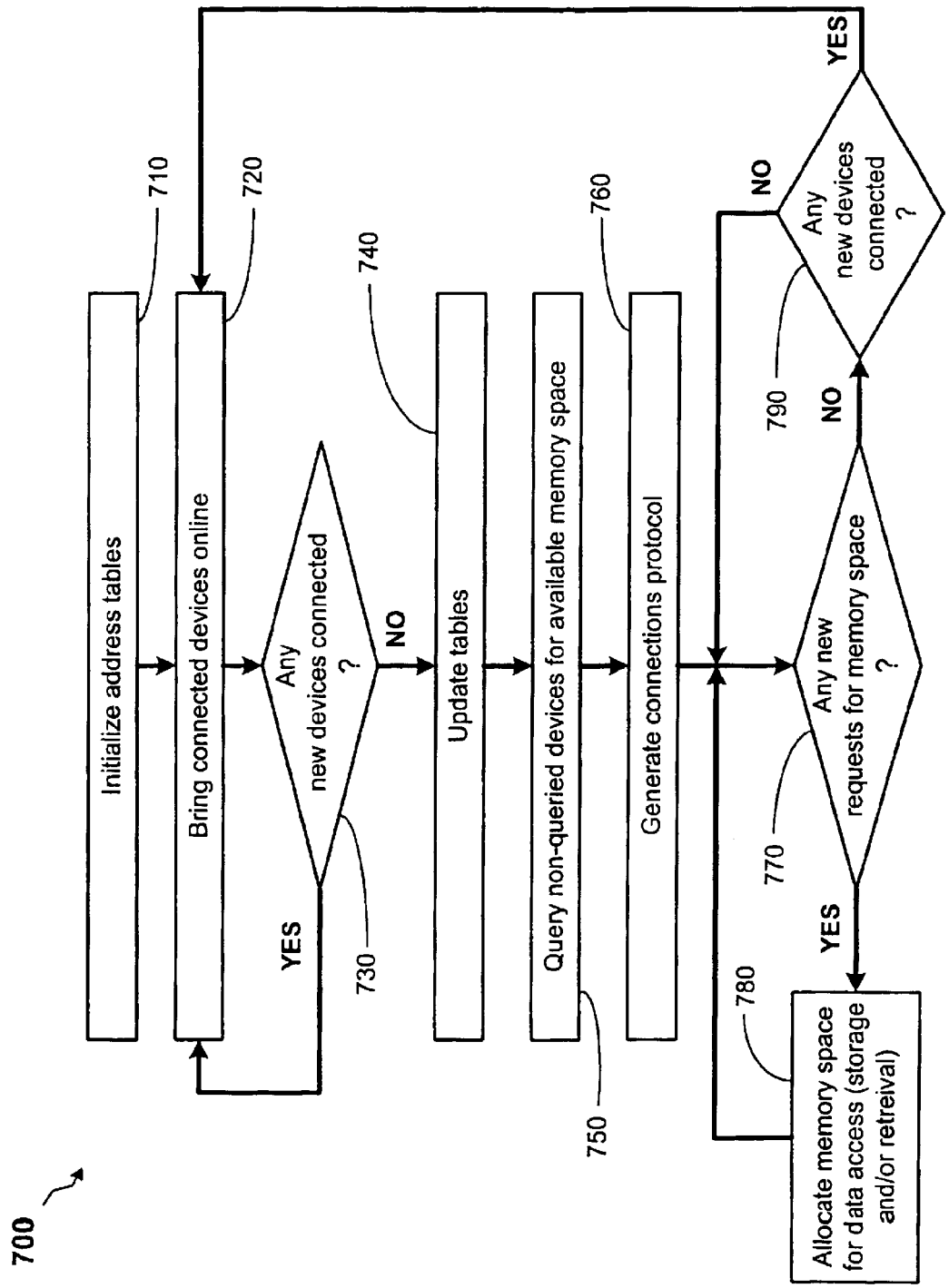
FIG. 7 is a flow chart for one embodiment of the operation of the memory service component, in accordance with one embodiment of the present invention.

FIG. 7 illustrates a flow chart that shows the operation of the memory service component 115 in accordance with one embodiment of the present invention. Upon start up, the memory service component 115 initializes the symbolic map table 420 and the address manager 340 (block 710). In one embodiment, the central device 110, which includes the memory service component 115, brings any connected devices 120–124 online upon being connected to the connecting media 180 (block 720). In one embodiment, the topography of the system 100 is pre-programmed into the central device 110. Therefore, the central device can search known input ports (not shown) connected to the connecting media 180, and detect whether a device 120–124 has been connected to an input ports. In an alternative embodiment, the central device 110 may query the input ports to detect whether a device 120–124 has been connected. If the central device 110 detects a device 120 connected to an input port, the central device 110 may send a "wake-up" signal and a "handshake" signal to the device 120 in order to bring the device online.

Once the connected devices are brought online, the memory service component 115 makes a check to determine whether any new devices are connected to the connecting media 180 (block 730). If any new devices are connected to the connecting media 180, the central device 110 will bring that particular device online. Once the devices 120–124 are brought online, the memory service component 115 will update the symbolic map table 420 to reflect the information relating to the devices that are brought online (block 740).

The central device 110 then queries any non-queried devices for available address space (block 750). The memory service component 115 in the central device 110 keeps track of any available addressable memory space in the devices that are online with the central device 110. The central device 110 then generates connection protocols either through the device interface 310, or through the remote interface 320, using the application interface 330 (block 760). To communicate with devices local to the central device 110, a connection protocol through the device interface 310 is established by the memory service component 115. To communicate with devices external to the central device 110, a connection protocol through the remote interface 320 is established by the memory service component 115. In one embodiment, the connection protocol through the remote interface 320 is established via the memory interface 370 in the memory controller 350. In other words, the central device 110 can gain access to memory space within a device 120 through the memory controller 350 associated with that particular device 120.

The central device 110 then monitors the connection protocol to determine whether there are any requests for memory space by any of the devices 120–124 that are online (block 770) In one embodiment, the central device 110 polls the devices 120–124 that are online in the system 100 to check for a request for memory space. In an alternative embodiment, the central device 110 makes a determination that a device has made a memory request, when the central device 110 receives an interrupt signal.

When the central device 110 determines that a device has made a memory access request, the central device 110 allocates a memory space for data storage or data retrieval (block 780). The allocation performed by the memory service component 115 includes allocating memory space across a plurality of devices 120–124 such that an application requesting memory space will be able to access a memory space which would seem virtually contiguous to that application.

Once the central device 110 allocates the proper memory space, the central device 110 checks for subsequent requests for memory space. When the central device 110 determines that there are no requests for memory space from any of the devices 120–124, the central device 110 monitors the connecting media 180 to check for any new devices that have been connected to the connecting media 180 (block 790). When a new device is connected to the connecting media 180, the central device 110 brings the connected device online and repeats the process described above. If no new devices are connected to the connecting media 180, the central device 110 continues to monitor the devices 120–124 for any requests for memory space.

Using the processes described above, some embodiments are capable of supporting memory allocations that are split across a plurality of devices or machines. Some embodiments may provide for extending symbolic addresses to symbolically refer to real memory address spaces instead of just individual memory address blocks. Utilizing the address snooping techniques described above in combination with the remote system communication described above, a plurality of devices, remote and local, can be used to create memory locations that would seem contiguous from the point of view of an application that is executed on any one of the devices 120–124. Generally, some embodiments can be implemented by using software. In some cases, techniques may also be used to address memory space in a partitioned disk drive or any other storage media.

One advantage of some embodiments of the present invention is the ability to allocate memory space across a number of devices 120–124 where the devices 120–124 have not been configured as distributed computers or distributed machines. In other words, embodiments of the present invention allow a system to allocate memory space across a number of devices that operate on different types of buses or different communication protocols (i.e., the memory service component 115 being able to communicate with memory controllers 350 in other devices 120–124 through a serial bus, a Universal Serial Bus (USB), or the like). This allows for the system 100 to interface with separate devices as if they were distributed devices. The embodiments of the present invention further provide the advantage of remote sharing of memory space across different types of devices 120–124, which can be accessed by various networks. This provides the distinct advantage of simplifying distributed computing using devices 120–124 that have diverse systems. Furthermore, data mirroring and data windowing are made more efficient by the implementations of the embodiments of the present invention. This provides efficient methods for improving data integrity and data sharing among different devices or machines.

The various system layers, routines, or modules may be executable control units (such as the memory control unit 115 [see FIG. 3] in the processor-based system 100). Each control unit may include a microprocessor, a microcontroller, a processor card (including one or more microprocessors or controllers), or other control or computing devices. The storage devices referred to in this discussion may include one or more machine-readable storage media for storing data and instructions. The storage media may include different forms or memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

What is claimed is:

1. A system, comprising:
    a first device;
    a second device;
    an interface to receive information from the first device and the second device; and
    a controller coupled to the interface, the controller to:
        determine that an amount of data to be stored on the first device exceeds an amount of available storage on the first device;
        query the second device to determine if the second device has available storage; and
        store a portion of the data on the second device, wherein the portion is accessible to the first device.

2. The system of claim 1, wherein the first device and the second device are interconnected to the controller through a connecting media.

3. The system of claim 2, wherein the connecting media is a network connection.

4. The system of claim 1, wherein the controller to store the portion of the data on the second device includes the controller to allocate memory space across the first device and the second device.

5. The system of claim 4, wherein the controller further includes the controller to employ a symbolic address mapping for addressing the memory space.

6. The system of claim 1, wherein the controller is integrated into at least one of the first device and the second device.

7. The system of claim 1, wherein the controller to store the portion of the data on the second device includes the controller to share addressable memory space mapped across the first device and the second device.

8. The system of claim 1, wherein the controller to store the portion of the data on the second device includes the controller to provide windowing for an application executed on at least one of the first device and the second device.

9. The system of claim 1, wherein the controller to store the portion of the data on the second device includes the controller to manage data movement between the first device and the second device.

10. The system of claim 9, wherein the controller to store the portion of the data on the second device further includes the controller to employ an address snooping agent for the managing data movement between the first device and the second device.

11. The system of claim 1, wherein the controller to store the portion of the data on the second device includes the controller to provide data integrity support for data mirrored by at least one of the first device and the second device.

12. The system of claim 1, wherein the controller is a memory service component, the memory service component comprising:
    an application interface for communicating with an application executed on at least one of the first device and the second device;

a device interface coupled to the application interface, the device interface to provide a communication path for the application interface to a device that is local to the memory service component;

a remote interface coupled to the application interface, the remote interface to provide a communication path for the application interface to a device that is remote to the memory service component;

an address manager coupled to the application interface, the address manager to provide an address to the application interface for locating the storage space; and an address snooping agent controller coupled to the application interface, the address snooping agent controller to allow the application interface to direct at least one memory access request by an application executed by at least one of the first device and the second device.

13. The system of claim 12, wherein the address manager comprises:

a symbolic map table;

a symbolic addressable space manager, the symbolic addressable space manager to access the symbolic map table to generate a symbolic address to address the storage space.

14. A method comprising:

determining that an amount of data to be stored on a first device exceeds an amount of available storage on the first device;

querying a second device to determine if the second device has available storage; and storing a portion of the data on the second device, wherein the portion is accessible to the first device.

15. The method of claim 14, wherein querying the second device includes enabling an amount of memory that can be addressed across the plurality of the devices to be determined.

16. The method of claim 14, wherein storing the portion of the data on the second device includes enabling, as at least a single storage unit, a first memory space of a first device and a second memory space of a second device to be allocated for storage.

17. The method of claim 16, wherein storing the portion of the data on the second device includes enabling an address to be generated for the single unit of memory space.

18. The method of claim 17, wherein enabling the address to be generated for the single unit of memory space includes enabling a virtual address to be generated, wherein the virtual address can be used by at least one of the first device and the second device for memory access.

19. The method of claim 18, wherein enabling the virtual address to be generated includes enabling a symbolic identifier of the memory space to be generated and offsetting the symbolic identifier by a displacement value.

20. The method of claim 19, wherein enabling the symbolic identifier of the memory space to be generated comprises enabling a symbolic map table to be generated wherein the symbolic map table includes entries which correlate to the memory space.

21. The method of claim 16, wherein storing the portion of the data on the second device includes enabling at least one of the first device and the second device to access the single unit of memory space across the first device and the second device.

22. The method of claim 21, wherein storing the portion of the data on the second device further includes enabling an application to be executed on at least one of the first device and the second device to access the single unit of memory space across the first device and the second device.

23. The method of claim 22, wherein storing the portion of the data on the second device further includes enabling the application executed on at least one of the first device and the second device to write data into the single unit of memory space across the first device and the second device.

24. The method of claim 22, wherein storing the portion of the data on the second device further includes enabling the application executed on at least one of the first device and the second device to read data from the single unit of memory space across the first device and the second device.

25. An article comprising a medium storing instructions that, if executed, enable a processor-based system to:

determine that an amount of data to be stored on a first device exceeds an amount of available storage on the first device;

query a second device to determine if the second device has available storage; and store a portion of the data on the second device, wherein the portion is accessible to the first device.

26. The article of claim 25 further storing instructions that, if executed, enable a processor-based system to determine at least a single unit of one memory space across the first device and the second device.

27. The article of claim 26 further storing instructions that, if executed, enable a processor-based system to determine an address for accessing the single unit of memory space across the first device and the second device.

28. The article of claim 26 further storing instructions that, if executed, enable a processor-based system to generate a virtual address to access the single unit of memory space across the first device and the second device.

29. The article of claim 26 further storing instructions that, if executed, enable a processor-based system to allow an application to be executed on at least one of the first device and the second device to access the single unit of memory space across the first device and the second device.

* * * * *